(12) United States Patent
Maeda et al.

US010934414B2

(10) Patent No.: US 10,934,414 B2
(45) Date of Patent: Mar. 2, 2021

(54) LONG FILM, LONG POLARIZING PLATE, LIQUID CRYSTAL DISPLAY DEVICE, AND METHOD FOR MANUFACTURING LONG FILM

(71) Applicant: FUJIFILM Corporation, Tokyo (JP)

(72) Inventors: Yoshinori Maeda, Kanagawa (JP); Shuhei Yamaguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 112 days.

(21) Appl. No.: 16/170,732

(22) Filed: Oct. 25, 2018

(65) Prior Publication Data

US 2019/0062526 A1 Feb. 28, 2019

Related U.S. Application Data

(63) Continuation of application No. PCT/JP2017/015016, filed on Apr. 12, 2017.

(30) Foreign Application Priority Data

Apr. 27, 2016 (JP) .............................. JP2016-089786

(51) Int. Cl.

| C08K 5/13 | (2006.01) |
|---|---|
| B29C 41/28 | (2006.01) |
| C08J 5/18 | (2006.01) |
| G02F 1/1335 | (2006.01) |
| C08K 5/053 | (2006.01) |
| C08L 1/12 | (2006.01) |
| G02B 5/30 | (2006.01) |
| C08L 1/10 | (2006.01) |
| C08L 1/14 | (2006.01) |
| B32B 23/00 | (2006.01) |
| G02B 1/14 | (2015.01) |
| G02B 1/18 | (2015.01) |
| B29K 1/00 | (2006.01) |
| B29L 31/34 | (2006.01) |
| C08K 5/134 | (2006.01) |
| C08K 5/45 | (2006.01) |

(52) U.S. Cl.
CPC ................ *C08K 5/13* (2013.01); *B29C 41/28* (2013.01); *B32B 23/00* (2013.01); *C08J 5/18* (2013.01); *C08K 5/053* (2013.01); *C08L 1/10* (2013.01); *C08L 1/12* (2013.01); *C08L 1/14* (2013.01); *G02B 1/14* (2015.01); *G02B 1/18* (2015.01); *G02B 5/30* (2013.01); *G02F 1/1335* (2013.01); *B29K 2001/08* (2013.01); *B29L 2031/3475* (2013.01); *C08J 2301/02* (2013.01); *C08J 2301/10* (2013.01); *C08K 5/134* (2013.01); *C08K 5/45* (2013.01); *C09K 2323/00* (2020.08); *C09K 2323/02* (2020.08); *C09K 2323/03* (2020.08); *C09K 2323/031* (2020.08); *G02B 5/3025* (2013.01); *G02F 1/133528* (2013.01); *Y02P 20/582* (2015.11)

(58) Field of Classification Search
CPC ............. G02F 1/133528; G02F 1/1335; G02B 5/3025; B29K 2001/08; C08L 1/10; C08L 1/12; C08L 1/14; C08K 5/13; C08K 5/45; C08K 5/134; C08J 2301/02; Y10T 428/10; Y10T 428/1036; Y10T 428/1041; Y10T 428/105; C09K 2323/00; C09K 2323/03; C09K 2323/031
USPC .......... 428/1.1, 1.3, 1.31, 1.33; 349/96, 117; 359/483.01, 489.07; 106/170.52
See application file for complete search history.

(56) References Cited

U.S. PATENT DOCUMENTS

| 6,596,354 B1 | 7/2003 | Longdon et al. |
| 2014/0238269 A1 | 8/2014 | Lee et al. |

FOREIGN PATENT DOCUMENTS

| CN | 103278877 A | 9/2013 |
|---|---|---|
| CN | 104007488 A | 8/2014 |
| JP | 2004-099631 A | 4/2004 |
| JP | 2005-279950 A | 10/2005 |
| JP | 2007-168419 A | 7/2007 |
| JP | 2007-313754 A | 12/2007 |
| JP | 2008-089855 A | 4/2008 |
| JP | 2008-089860 A | 4/2008 |
| JP | 2008-257220 A | 10/2008 |
| JP | 2010-231208 A | 10/2010 |
| JP | 5441995 B2 | 3/2014 |
| JP | 5503375 B2 | 5/2014 |
| JP | 2014-164304 A | 9/2014 |
| KR | 2015-0003419 A | 1/2015 |
| KR | 20150003419 A * | 1/2015 |

OTHER PUBLICATIONS

International Search Report issued in PCT/JP2017/015016 dated May 23, 2017.
Written Opinion issued in PCT/JP2017/015016 dated May 23, 2017.
International Preliminary Report on Patentability (Chapter 11) completed on Mar. 7, 2018, in connection with International Patent Application No. PCT/JP2017/015016.

(Continued)

*Primary Examiner* — Ruiyun Zhang
(74) *Attorney, Agent, or Firm* — Edwards Neils LLC; Jean C. Edwards, Esq.

(57) ABSTRACT

A long film containing a cellulose acylate and a compound A having a molecular weight of less than 1,000 which satisfies conditions 1-4. Condition 1: containing two or more aromatic rings each directly connected to a hydroxyl group in a molecule. Condition 2: containing one or more carbon atoms directly connected to an aromatic ring directly connected to a hydroxyl group and do not constitute the aromatic ring in a molecule, the carbon atoms being directly connected to 1 to 3 aromatic rings. Condition 3: Each carbon atom directly connected to an aromatic ring directly connected to a hydroxyl group and not constituting the aromatic ring has no bond with a hydrogen atom. Condition 4: Each carbon atom directly connected to an aromatic ring directly connected to a hydroxyl group and not constituting the aromatic ring is bonded by a single bond to atoms other than hydrogen atoms.

5 Claims, No Drawings

(56) References Cited

OTHER PUBLICATIONS

Office Action, issued by the State Intellectual Property Office dated Apr. 17, 2020, in connection with Chinese Patent Application No. 201780026074.4.
Office Action, issued by the State Intellectual Property Office dated Oct. 16, 2020, in connection with Chinese Patent Application No. 201780026074.4.

* cited by examiner

LONG FILM, LONG POLARIZING PLATE, LIQUID CRYSTAL DISPLAY DEVICE, AND METHOD FOR MANUFACTURING LONG FILM

CROSS-REFERENCE TO RELATED APPLICATIONS

This is a continuation of International Application No. PCT/JP2017/015016 filed on Apr. 12, 2017, which was published under Article 21(2) in Japanese, and which claims priority from Japanese Patent Application No. 2016-089786 filed on Apr. 27, 2016. The above applications are hereby expressly incorporated by reference, in their entirety, into the present application.

BACKGROUND OF THE INVENTION

1. Field of the Invention

The present invention relates to a long film, a long polarizing plate, a liquid crystal display device, and a method for manufacturing the long film.

2. Description of the Related Art

A cellulose acylate film is widely used for optical applications such as a polarizing plate protective film. Industrially, the cellulose acylate film is often produced as a long-shaped form (long film) by a solution film-forming method (solvent casting method).

In many cases, the solution film-forming method includes a step where a solution (dope) obtained by dissolving a cellulose acylate and, if necessary, other additives in a solvent is cast on a casting support to form a casting film called a web, in which the web is, through a drying step and the like, peeled off from the casting support, and is dried until a residual solvent amount reaches a certain amount or less and rolled up.

JP2005-279950A describes a technique for suppressing curls (end portion curls) generated at end portions of a film by contriving a film conveying method in a solution film-forming method. Here, the end portion curl is a curl which is generated at an end portion in a width direction (a direction orthogonal to a longitudinal direction) of a long film due to a difference in drying speed between a casting support side and an air interface side of the film. Once the end portion curl is generated, the curl also remains on the film after completion of drying. Thus, it becomes difficult to perform conveying in post-steps such as a polarizing plate processing step.

JP5441995B describes a technique for improving reworkability of a film by regulating a temperature in a solution film-forming method. Here, rework is an operation of first peeling a polarizing plate having a cellulose acylate film as a polarizing plate protective film off from a glass substrate of a liquid crystal cell and reusing the glass substrate, in a case where it is not possible to perform lamination in a desired state at the time of laminating the polarizing plate on the glass substrate. At the time of rework, in a case where the cellulose acylate film is peeled cleanly without being left on the glass substrate, reworkability is said to be good.

In addition, JP2004-099631A, JP2008-257220A, JP5503375B, and JP2010-231208A describe adding various additives to a cellulose acylate film.

SUMMARY OF THE INVENTION

In recent years, in order to realize cost reduction of a liquid crystal panel, demand for cost reduction of a polarizing plate protective film has been extremely increasing.

In order to achieve cost reduction of the polarizing plate protective film and the liquid crystal panel, it is important to (1) improve a production speed of the polarizing plate protective film, (2) improve storability (property which allows performance not to change even in a case where storage, transport, and the like are performed without managing temperature and humidity) of a polarizing plate, (3) improve reworkability (which improves a yield of liquid crystal panels and leads to cost reduction), and (4) suppress foreign matters generated during film manufacture (volatilization of additives during film manufacture causes contamination in a film manufacturing step, in which impurities adhere to a film and become foreign matters, which leads to decrease of visibility. Thus, a part where foreign matters are generated cannot be used as a polarizing plate protective film and a yield or productivity of the film is decreased).

In the techniques of JP2005-279950A and JP5441995B, attention is paid to a film conveying method and a temperature at the time of film formation. However, methods other than these, in particular, a method of improving the above (1) to (4) by using additives for a cellulose acylate film is also simple and sought.

In JP2004-099631A, JP2008-257220A, JP5503375B, and JP2010-231208A, no studies are made with regard to the above (1) to (4).

The present invention has been made in view of the above circumstances, and an object of the present invention is to provide a long film which is excellent in polarizing plate storability and reworkability due to suppression of end portion curls and foreign matters, a long polarizing plate containing the long film, a liquid crystal display device containing a film or polarizing plate obtained from the long film or long polarizing plate, and a method for manufacturing the long film.

The present inventors have made intensive studies and have found that the above-mentioned problems can be solved by the following constitution.

[1] A long film comprising:
a cellulose acylate; and
a compound A having a molecular weight of less than 1,000 which satisfies all of the following conditions 1, 2, 3, and 4.

Condition 1: two or more aromatic rings, each of which is directly connected to a hydroxyl group, are contained in a molecule.

Condition 2: one or more carbon atoms which are directly connected to an aromatic ring directly connected to a hydroxyl group and do not constitute the aromatic ring are contained in a molecule, and such carbon atoms are directly connected to 1 to 3 aromatic rings.

Condition 3: all carbon atoms, each of which is directly connected to an aromatic ring directly connected to a hydroxyl group and does not constitute the aromatic ring have no bond with a hydrogen atom.

Condition 4: all carbon atoms, each of which is directly connected to an aromatic ring directly connected to a hydroxyl group and does not constitute the aromatic ring are bonded by a single bond to atoms other than hydrogen atoms.

[2] The long film according to [1],
in which the carbon atoms of the condition 2 are quaternary carbon atoms.

[3] The long film according to [1] or [2],
in which the compound A has 2 to 4 aromatic rings, each of which is directly connected to a hydroxyl group, in a molecule.

[4] The long film according to any one of [1] to [3],
in which the compound A has the carbon atoms of the condition 2 between at least two aromatic rings, each of which is directly connected to a hydroxyl group.

[5] The long film according to any one of [1] to [4],
in which the compound A has a structure in which at least two aromatic rings, each of which is directly connected to a hydroxyl group, are bonded to each other via one carbon atom of the condition 2.

[6] The long film according to any one of [1] to [5],
in which the aromatic ring directly connected to a hydroxyl group in the compound A is a benzene ring directly connected to a hydroxyl group.

[7] The long film according to [1],
in which the compound A is a compound represented by General Formula (1),

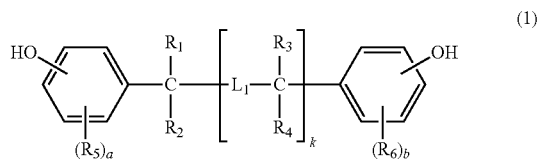

in General Formula (1), $R_1$ to $R_4$ each independently represent an alkyl group, an aryl group, a hydroxyl group, an acyl group, an alkoxy group, or an alkyloxycarbonyl group, $R_1$ and $R_2$ may combine with each other to form an alicyclic ring, $R_3$ and $R_4$ may combine with each other to form an alicyclic ring, $R_5$ and $R_6$ each independently represent a tertiary alkyl group or an aryl group, a and b each independently represent an integer of 0 to 4, $L_1$ represents a single bond or a divalent linking group, and k represents 0 or 1.

[8] The long film according to any one of [1] to [7],
in which the compound A is contained in an amount of 1 to 30 parts by mass with respect to 100 parts by mass of the cellulose acylate.

[9] A long polarizing plate, comprising:
the long film according to any one of [1] to [8], and
a polarizer.

[10] A liquid crystal display device, comprising:
a liquid crystal cell; and
a film obtained from the long film according to any one of [1] to [8], or a polarizing plate obtained from the long polarizing plate according to [9].

[11] A method for manufacturing a long film, comprising:
performing film formation by a solution film-forming method using a solution obtained by dissolving a cellulose acylate and a compound A having a molecular weight of less than 1,000 which satisfies all of the following conditions 1, 2, 3, and 4 in a solvent.

Condition 1: two or more aromatic rings, each of which is directly connected to a hydroxyl group, are contained in a molecule.

Condition 2: one or more carbon atoms which are directly connected to an aromatic ring directly connected to a hydroxyl group and do not constitute the aromatic ring are contained in a molecule, and such carbon atoms are directly connected to 1 to 3 aromatic rings.

Condition 3: all carbon atoms, each of which is directly connected to an aromatic ring directly connected to a hydroxyl group and does not constitute the aromatic ring have no bond with a hydrogen atom.

Condition 4: all carbon atoms, each of which is directly connected to an aromatic ring directly connected to a hydroxyl group and does not constitute the aromatic ring are bonded by a single bond to atoms other than hydrogen atoms.

According to the present invention, it is possible to provide a long film which is excellent in polarizing plate storability and reworkability due to suppression of end portion curls and foreign matters, a long polarizing plate containing the long film, a liquid crystal display device containing a film or polarizing plate obtained from the long film or long polarizing plate, and a method for manufacturing the long film.

DESCRIPTION OF THE PREFERRED EMBODIMENTS

Hereinafter, the present invention will be described in detail. Descriptions of constituent requirements described below are made based on representative embodiments of the present invention, but the present invention is not limited to such embodiments.

In the present specification, in a case where a range of numerical values is expressed as "(numerical value 1) to (numerical value 2)", this description means "equal to or greater than (numerical value 1) and equal to or less than (numerical value 2)".

[Long Film]

The long film of the present invention is a long film that contains a cellulose acylate, and a compound A having a molecular weight of less than 1,000 which satisfies all of the following conditions 1, 2, 3, and 4.

Condition 1: Two or more aromatic rings, each of which is directly connected to a hydroxyl group, are contained in a molecule.

Condition 2: One or more carbon atoms which are directly connected to an aromatic ring directly connected to a hydroxyl group and do not constitute the aromatic ring are contained in a molecule, and such carbon atoms are directly connected to 1 to 3 aromatic rings.

Condition 3: All carbon atoms, each of which is directly connected to an aromatic ring directly connected to a hydroxyl group and does not constitute the aromatic ring have no bond with a hydrogen atom.

Condition 4: All carbon atoms, each of which is directly connected to an aromatic ring directly connected to a hydroxyl group and does not constitute the aromatic ring are bonded by a single bond to atoms other than hydrogen atoms.

<Cellulose Acylate>

The long film of the present invention contains a cellulose acylate.

The cellulose acylate is an ester of cellulose and a carboxylic acid, in which as the carboxylic acid, a fatty acid having 2 to 22 carbon atoms is preferable, a cellulose acylate in which the carboxylic acid is a lower fatty acid having 2 to 4 carbon atoms is more preferable, and a cellulose acetate having 2 carbon atoms is most preferable.

As cellulose raw materials for the cellulose acylate, cotton linter, wood pulp (hardwood pulp, softwood pulp), and the like are mentioned. Even a cellulose acylate obtained from any cellulose raw material may be used, and, in some cases, a mixture of cellulose acylates may be used. Regarding a detailed description of these cellulose raw materials, for example, it is possible to use cellulose described in "Lecture on Plastic Materials (17) Cellulosic Resins (Maruzawa and Uda, THE NIKKAN KOGYO SHIMBUN, LTD., published in 1970) or Japan Institute of Invention and Innovation Journal of Technical Disclosure 2001-1745 (pages 7 to 8), and a cellulose acylate film of the present invention is not particularly limited.

The cellulose acylate is a cellulose acylate obtained by substituting a hydroxyl group of cellulose with an acyl group, and the acyl group has preferably 2 to 22 carbon atoms. As the acyl group having 2 to 22 carbon atoms, an aliphatic group or an aryl group may be used, and there are no particular limitations. One of the acyl groups may be used, or two or more thereof may be used. Examples of those cellulose acylates include an alkylcarbonyl ester, an alkenylcarbonyl ester, an aromatic carbonyl ester, and an aromatic alkylcarbonyl ester of cellulose, each of which may further have a substituted group. Preferred examples of these acyl groups include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an i-butanoyl group, a t-butanoyl group, a cyclohexanecarbonyl group, an oleoyl group, a benzoyl group, a naphthylcarbonyl group, and a cinnamoyl group. Among these, an acetyl group, a propionyl group, a butanoyl group, a dodecanoyl group, an octadecanoyl group, a t-butanoyl group, an oleoyl group, a benzoyl group, a naphthylcarbonyl group, a cinnamoyl group, and the like are preferable, and an acetyl group, a propionyl group, and a butanoyl group are more preferable. Even more preferable groups are an acetyl group and a propionyl group, and the most preferable group is an acetyl group.

A degree of polymerization of the cellulose acylate is, in terms of viscosity average polymerization degree, preferably 180 to 700, and, for a cellulose acetate, 180 to 550 is more preferable, 180 to 400 is even more preferable, and 180 to 350 is particularly preferable. The viscosity average polymerization degree can be determined by the intrinsic viscosity method of Uda et al. (Kazuo Uda, Hideo Saito, "journal of the Society of Fiber Science and Technology, Japan", Vol. 18, No. 1, pages 105 to 120 (1962)). This method is also described in detail in JP1997-95538A (JP-H09-95538A).

A molecular weight distribution of the cellulose acylate is evaluated with gel permeation chromatography (GPC-8020 (trade name) manufactured by Tosoh Corporation) using N-methylpyrrolidone as a solvent, and it is preferable that the cellulose acylate has a small polydispersity index Mw/Mn (Mw represents a weight average molecular weight, and Mn represents a number average molecular weight) and a narrow molecular weight distribution. A specific value of Mw/Mn is preferably 1.0 to 4.0, more preferably 2.0 to 4.0, and most preferably 2.3 to 3.4.

(Acyl Substitution Degree of Cellulose Acylate)

The cellulose acylate is obtained by acylating hydroxyl groups of cellulose, and, regarding measurement of a degree of substitution of acyl groups to the hydroxyl groups of cellulose, it is possible to obtain the degree of substitution by measuring and calculating a degree of bonding of acetic acids and/or fatty acids having 3 to 22 carbon atoms which substitute the hydroxyl groups of cellulose. As a measurement method, it is possible to carry out the measurement according to ASTM D-817-91.

An average acyl substitution degree of the cellulose acylate is preferably 1.8 to 3.0, more preferably 2.0 to 2.9, and even more preferably 2.3 to 2.9.

A content of the cellulose acylate in the long film of the present invention is, with respect to 100 parts by mass of the long film, preferably equal to or greater than 50 parts by mass and less than 100 parts by mass, more preferably equal to or greater than 65 pails by mass and less than 100 parts by mass, and even more preferably equal to or greater than 80 parts by mass and less than 100 parts by mass.

<Compound A>

The long film of the present invention contains a compound A having a molecular weight of less than 1,000 which satisfies all of the following conditions 1, 2, 3, and 4.

Condition 1: Two or more aromatic rings, each of which is directly connected to a hydroxyl group, are contained in a molecule.

Condition 2: One or more carbon atoms which are directly connected to an aromatic ring directly connected to a hydroxyl group and do not constitute the aromatic ring are contained in a molecule, and such carbon atoms are directly connected to 1 to 3 aromatic rings.

Condition 3: All carbon atoms, each of which is directly connected to an aromatic ring directly connected to a hydroxyl group and does not constitute the aromatic ring have no bond with a hydrogen atom.

Condition 4: All carbon atoms, each of which is directly connected to an aromatic ring directly connected to a hydroxyl group and does not constitute the aromatic ring are bonded by a single bond to atoms other than hydrogen atoms.

The condition 1 of the compound A is that two or more aromatic rings, each of which is directly connected to a hydroxyl group, are contained in a molecule in the present invention, the number of aromatic rings is considered as the number of rings having aromaticity. For example, the number of aromatic rings contained in naphthalene which is a fused ring compound is counted as two, and the number of aromatic rings contained in fluorene is counted as two. In addition, even in a case where a plurality of hydroxyl groups are directly connected to one aromatic ring, the number of "aromatic rings, each of which is directly connected to a hydroxyl group," is one.

The present inventors consider that due to a high acidity possessed by a hydroxyl group directly connected to an aromatic ring, in a case where the condition 1 is satisfied, the hydroxyl group of the compound A interacts with a carbonyl group of the cellulose acylate to form a strong hydrogen bond, and a film in which curls are hardly generated can be produced.

The condition 2 of the compound A is that one or more carbon atoms which are directly connected to an aromatic ring directly connected to a hydroxyl group and do not constitute the aromatic ring are contained in a molecule, and such carbon atoms are directly connected to 1 to 3 aromatic rings. The carbon atoms which do not constitute the aromatic ring means carbon atoms which are not ring member atoms of the aromatic ring. In a case where the condition 2 is satisfied, an excellent flexibility as a compound is exhibited, and it becomes easy to interact with the cellulose acylate.

In a case where the condition 2 is not satisfied, for example, a compound having a structure in which aromatic rings are directly connected to each other exhibits a low flexibility as a compound. Thus, it is considered that brittleness of a film deteriorates, and end portion curls and reworkability of the film are inferior.

From the viewpoint of end portion curls and reworkability, by causing the carbon atoms of the above condition 2 to be directly connected to 1 to 3 aromatic rings in the compound A, it is considered that a carbonyl group of the cellulose acylate and a hydroxyl group of the compound A interact moderately, and a film in which curls are hardly generated while not deteriorating brittleness can be produced. In a case where the number of aromatic rings directly connected to the carbon atoms of the condition 2 is 4, it is considered that a flexibility as a compound is decreased, interaction with the cellulose acylate hardly occurs, and performance is decreased.

In the compound A, it is preferable that the carbon atoms of the above condition 2 are directly connected to two aromatic rings.

From the viewpoint of reworkability, in the compound A, it is preferable that the carbon atoms of the above condition 2 are quaternary carbon atoms.

It is preferable that the compound A has 2 to 4 aromatic rings, each of which is directly connected to a hydroxyl group, in a molecule. In a case where the number of the aromatic rings, each of which is directly connected to a hydroxyl group and which are possessed by the compound A is 4 or less, a water content of a film is not increased and a dimensional change of the film due to adsorption and desorption of moisture is suppressed, which are preferable.

From the viewpoint of end portion curls and reworkability, it is preferable that the compound A has the carbon atoms of the above condition 2 between at least two aromatic rings, each of which is directly connected to a hydroxyl group, and it is more preferable that the compound A has a structure in which at least two aromatic rings, each of which is directly connected to a hydroxyl group, are bonded to each other via one carbon atom of the above condition 2.

The compound A may contain a monocyclic or polycyclic aromatic hydrocarbon ring or may contain a monocyclic or polycyclic aromatic hetero ring.

The aromatic hydrocarbon ring is preferably an aromatic hydrocarbon ring having 6 to 14 carbon atoms, and more preferably an aromatic hydrocarbon ring having 6 carbon atoms. As the aromatic hydrocarbon ring, specifically, a benzene ring and a naphthalene ring are mentioned, and a benzene ring is particularly preferable.

As the aromatic hetero ring, an aromatic hetero ring containing a sulfur atom, a nitrogen atom, or an oxygen atom is mentioned, with an aromatic hetero ring having 5 to 14 carbon atoms being preferable, and an aromatic hetero ring having 5 to 6 carbon atoms being more preferable. As the aromatic hetero ring, specifically, a thiophene ring, a furan ring, a pyrrole ring, and a pyridine ring are mentioned, with a thiophene ring or a furan ring being preferable.

The compound A preferably contains an aromatic hydrocarbon ring from the viewpoint of compatibility with a cellulose acylate.

From the viewpoint of solution solubility, the compound A preferably contains a monocyclic aromatic hydrocarbon ring or a monocyclic aromatic hetero ring.

The compound A most preferably contains a benzene ring.

From the viewpoint of reworkability, it is preferable that the aromatic ring directly connected to a hydroxyl group in the compound A is a benzene ring directly connected to a hydroxyl group.

The conditions 3 and 4 of the compound A are that all carbon atoms, each of which is directly connected to an aromatic ring directly connected to a hydroxyl group and does not constitute the aromatic ring have no bond with a hydrogen atom, and are bonded by a single bond to atoms other than hydrogen atoms.

In a case where the condition 3 is not satisfied, that is, in a case where a hydrogen atom is directly connected to the carbon atom directly connected to the aromatic ring directly connected to a hydroxyl group, this hydrogen atom undergoes stabilization due to resonance, and thus easily generates an anion, a cation, or a radical. Therefore, it is considered that undesirable side reactions are caused to deteriorate a polarizing plate storability.

In a case where the condition 4 is not satisfied, that is, in a case of having a multiple bond such as a double bond, planarity of the compound is improved and flexibility of the compound is decreased. Thus, brittleness of a film deteriorates and reworkability thereof is decreased.

The compound A satisfies the conditions 3 and 4 for all carbon atoms, each of which is directly connected to the aromatic ring directly connected to a hydroxyl group and does not constitute the aromatic ring, and it is preferable that the compound A satisfies the conditions 3 and 4 for all carbon atoms which are directly connected to all aromatic rings and do not constitute the aromatic rings.

The compound A is preferably a compound represented by any one of General Formulas (1) to (3), and more preferably a compound represented by General Formula (1).

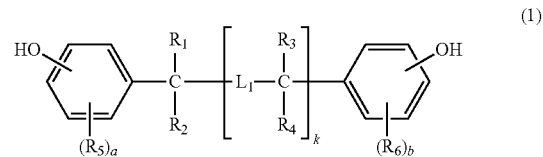

In General Formula (1), $R_1$ to $R_4$ each independently represent an alkyl group, an aryl group, a hydroxyl group, an acyl group, an alkoxy group, or an alkyloxycarbonyl group.

$R_1$ and $R_2$ may combine with each other to form an alicyclic ring.

$R_3$ and $R_4$ may combine with each other to form an alicyclic ring.

$R_5$ and $R_6$ each independently represent a tertiary alkyl group or an aryl group.

a and b each independently represent an integer of 0 to 4.

$L_1$ represents a single bond or a divalent linking group.

k represents 0 or 1.

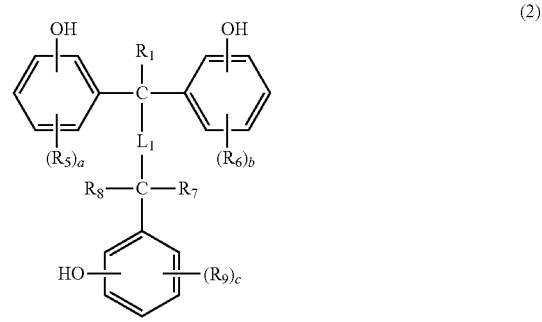

In General Formula (2)

$R_1$, $R_7$, and $R_8$ each independently represent an alkyl group, an aryl group, a hydroxyl group, an acyl group, an alkoxy group, or an alkyloxycarbonyl group.

$R_7$ and $R_8$ may combine with each other to form an alicyclic ring.

$R_5$, $R_6$, and $R_9$ each independently represent a tertiary alkyl group or an aryl group.

a, b, and c each independently represent an integer of 0 to 4.

$L_1$ represents a single bond or a divalent linking group.

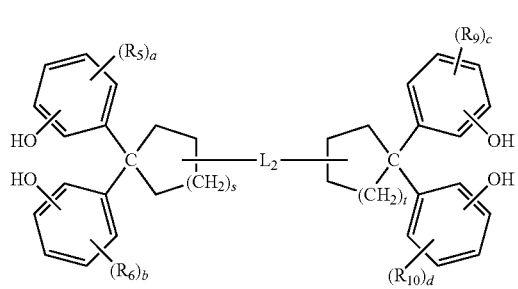

(3)

In General Formula (3)

$R_5$, $R_6$, $R_9$, and $R_{10}$ each independently represent a tertiary alkyl group or an aryl group.

a, b, c and d each independently represent an integer of 0 to 4.

$L_2$ represents a single bond or a divalent non-aromatic linking group.

s and t each independently represent an integer of 1 or more.

General Formula (1) will be described.

In General Formula (1), $R_1$ to $R_4$ each independently represent an alkyl group, an aryl group, a hydroxyl group, an acyl group, an alkoxy group, or an alkyloxycarbonyl group.

In a case where $R_1$ to $R_4$ represent alkyl groups, $R_1$ to $R_4$ preferably represent alkyl groups having 1 to 5 carbon atoms, more preferably represent alkyl groups having 1 to 3 carbon atoms, and even more preferably represent methyl groups.

In a case where $R_1$ to $R_4$ represent aryl groups, $R_1$ to $R_4$ preferably represent phenyl groups or naphthyl groups, and more preferably represent phenyl groups.

In a case where $R_1$ to $R_4$ represent acyl groups, $R_1$ to $R_4$ preferably represent acyl groups having 2 to 5 carbon atoms, and more preferably represent acetyl groups.

In a case where $R_1$ to $R_4$ represent alkoxy groups, $R_1$ to $R_4$ preferably represent alkoxy groups having 1 to 5 carbon atoms, and more preferably represent alkoxy groups having 1 to 3 carbon atoms.

In a case where $R_1$ to $R_4$ represent alkyloxycarbonyl groups, $R_1$ to $R_4$ preferably represent alkyloxycarbonyl groups having 2 to 5 carbon atoms, and more preferably represent methyloxycarbonyl groups.

It is particularly preferable that $R_1$ to $R_4$ each independently represent alkyl groups.

$R_1$ and $R_2$ may combine with each other to form an alicyclic ring, and $R_3$ and $R_4$ may combine with each other to form an alicyclic ring. The alicyclic ring is preferably a cycloalkane ring having 5 to 7 carbon atoms, and more preferably a cycloalkane ring having 5 or 6 carbon atoms.

The compound A is also preferably in a mode in which $R_1$ and $R_2$ combine with each other to form an alicyclic ring, or a mode in which $R_3$ and $R_4$ combine with each other to form an alicyclic ring.

$R_5$ and $R_6$ each independently represent a tertiary alkyl group or an aryl group.

In a case where $R_5$ and $R_6$ represent tertiary alkyl groups, $R_5$ and $R_6$ are preferably tertiary alkyl groups having 4 to 7 carbon atoms, and particularly preferably t-butyl groups.

In a case where $R_5$ and $R_6$ represent aryl groups, $R_5$ and $R_6$ are preferably aryl groups having 6 to 12 carbon atoms, and particularly preferably phenyl groups.

It is preferable that $R_5$ and $R_6$ each independently represent tertiary alkyl groups.

a and b each independently represent an integer of 0 to 4, and preferably represent 0 or 1.

$L_1$ represents a single bond or a divalent linking group.

In a case where $L_1$ represents a divalent linking group, $L_1$ is preferably an alkylene group (preferably having 1 to 5 carbon atoms), an arylene group (preferably having 6 to 12 carbon atoms), a carbonyl group, a carbonic acid ester group, an amide group, a urethane group, or an ether group, and more preferably an alkylene group or an arylene group.

k represents 0 or 1, and preferably 0.

General Formula (2) will be described.

In General Formula (2), $R_1$, $R_5$, $R_6$, a, b, and $L_1$ have the same meanings as $R_1$, $R_5$, $R_6$, a, b, and $L_1$ in General Formula (1), respectively, and preferable ranges thereof are also the same.

In General Formula (2), $R_7$ and $R_8$ have the same meaning as $R_1$, and preferable ranges thereof are also the same.

In General Formula (2), $R_9$ has the same meaning as $R_5$ and $R_6$, and a preferable range thereof is also the same.

In General Formula (2), c has the same meaning as a and b, and a preferable range thereof is also the same.

General Formula (3) will be described.

In General Formula (3), $R_5$, $R_6$, $R_9$, a, b, and c each have the same meanings as $R_5$, $R_6$, $R_9$, a, b, and c in General Formula (2), respectively, and preferable ranges thereof are also the same.

In General Formula (3), $R_{10}$ has the same meanings as $R_5$, $R_6$, and $R_9$, and a preferable range thereof is also the same.

In General Formula (3), d has the same meanings as a, b, and c, and a preferable range thereof is also the same.

In General Formula (3), $L_2$ represents a single bond or a divalent non-aromatic linking group. In a case where $L_2$ represents a divalent non-aromatic linking group, $L_2$ preferably is an alkylene group (preferably having 1 to 5 carbon atoms).

In General Formula (3), s and t each independently represent an integer of 1 or more, preferably an integer of 1 to 3, and more preferably 1 or 2.

From the viewpoint of end portion curls and reworkability, a molecular weight of the compound A is less than 1,000, and from the viewpoint of compatibility with a cellulose acylate, the molecular weight is preferably equal to or less than 800, and more preferably equal to or less than 700. It is considered that a compound with a smaller molecular weight has a smaller molecular size and more easily interacts with a cellulose acylate. In addition, from the viewpoint that volatilization hardly occurs in a case of being heated and contamination in a step hardly occurs, the molecular weight of the compound A is preferably equal to or greater than 200, and more preferably equal to or greater than 300.

Specific examples of the compound A are shown below, but the compound A is not limited thereto.

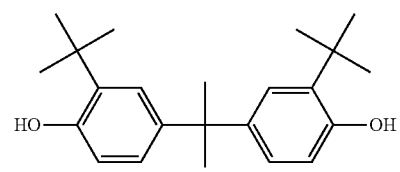

-continued

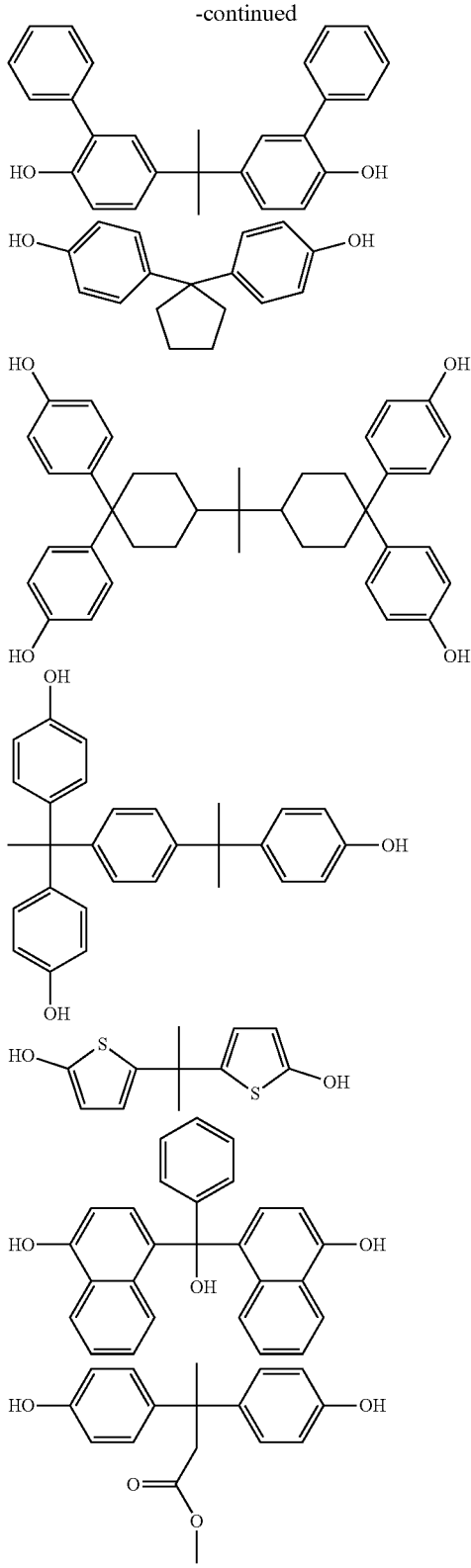

A content of the compound A in the long film of the present invention is preferably 1 to 30 parts by mass, more preferably 1 to 20 parts by mass, even more preferably 4 to 15 parts by mass, and particularly preferably 7 to 12 parts by mass, with respect to 100 parts by mass of the cellulose acylate.

It is preferable that the long film of the present invention has a width of 1,000 mm to 2,500 mm and a length of 1,000 m to 10,000 m, from the viewpoint of ease of transport and ease of processing during a polarizing plate processing.

(Retardation)

In the present invention, Re ($\lambda$) and Rth ($\lambda$) represent an in-plane retardation and a thickness-direction retardation, respectively, at a wavelength $\lambda$ (nm). In a case of being not specifically indicated, the wavelength $\lambda$ is set to 550 nm.

In the present invention, Re ($\lambda$) and Rth ($\lambda$) are values measured at the wavelength $\lambda$ in AxoScan OPMF-1 (manufactured by Optoscience). By inputting an average refractive index (($N_x+N_y+N_z$)/3) and a film thickness (d ($\mu$m)) into AxoScan, the following is calculated:

Slow axis direction (°)

$$Re\ (\lambda)=(N_x-N_y)\times d$$

Rth ($\lambda$)=(($N_x+N_y$)/2$-N_z$)$\times$d. $N_x$ is a refractive index in the slow axis direction of a film, $N_y$ is a refractive index in a fast axis direction of the film, and $N_z$ is a refractive index in a thickness direction of the film.

A film of the present invention can be used for liquid crystal display devices of various display modes, and, in particular, is preferably used for a vertical alignment (VA)-mode or in-plane switching (IPS)-mode liquid crystal display device.

In a case of being used for the VA-mode liquid crystal display device, it is preferable that in a case of being measured at a temperature of 25° C., a relative humidity of 60%, and a measurement wavelength of 550 nm, Re (550) is 20 nm to 80 nm and Rth (550) is 80 nm to 300 nm.

In a case of being used for the IPS-mode liquid crystal display device, it is preferable that in a case of being measured at a temperature of 25° C., a relative humidity of 60%, and a measurement wavelength of 550 nm, Re (550) is −20 nm to 20 nm and Rth (550) is −20 nm to 20 nm.

As described above, the film of the present invention can also be used as a phase difference film by controlling optical characteristics, and is preferably used as a phase difference film for the VA-mode liquid crystal display device or IPS-mode liquid crystal display device.

In particular, in a case where the number of aromatic rings per 100 molecular weight of the compound A contained in the film of the present invention is equal or greater than 0.75, the film is preferably used as a phase difference film for the VA-mode liquid crystal display device.

In addition, in a case where the number of aromatic rings per 100 molecular weight of the compound A contained in the film of the present invention is less than 0.75, the film is preferably used as a phase difference film for the IPS-mode liquid crystal display device.

A film thickness of the film of the present invention is preferably 20 $\mu$m to 100 $\mu$m, and more preferably 25 $\mu$m to 80 $\mu$m, in particular, in a case of being used for the VA liquid crystal display device, the film thickness is even more preferably 25 $\mu$m to 45 $\mu$m. In addition, in a case of being used for the IPS liquid crystal display device, the film thickness is even more preferably 25 $\mu$m to 45 $\mu$m.

In addition, a layer constitution of the film of the present invention is not particularly limited, and the film may have a single layer or may have a plurality of layers including, for example, a core layer and a skin layer.

A thickness of the skin layer is preferably 0.3 to 5 $\mu$m, more preferably 0.3 to 3 $\mu$m, and even more preferably 0.3 to 2 $\mu$m.

The thickness of the skin layer is measured using FE 3000 (manufactured by Otsuka Electronics Co., Ltd.).

A thickness of the core layer is calculated by measuring a thickness of the entire layer with a stylus-type film thickness meter and subtracting the thickness of the skin layer. A preferable thickness of the core layer is equal to a value obtained by subtracting the preferable thickness of the skin layer from the preferable thickness of the entire layer.

In addition, in the film of the present invention, a functional layer may be separately stacked, and examples of the functional layer include a phase difference layer, a hard coat layer, an antiglare layer, and an antireflection layer.

[Additives]

In the present invention, as additives for a film, known additives can be used, and, specifically, a retardation controlling agent, a retardation adjusting agent, a deterioration inhibitor, an ultraviolet inhibitor, a release accelerator, a plasticizer, an infrared ray absorbing agent, a matting agent, and the like can be mentioned.

[Method for Manufacturing Long Film]

The method for manufacturing a long film of the present invention is a method for manufacturing a long film, which includes performing film formation by a solution film-forming method using a solution obtained by dissolving a cellulose acylate and a compound A having a molecular weight of less than 1,000 which satisfies all of the following conditions 1, 2, 3, and 4 in a solvent.

Condition 1: Two or more aromatic rings, each of which is directly connected to a hydroxyl group, are contained in a molecule.

Condition 2: One or more carbon atoms which are directly connected to an aromatic ring and do not constitute the aromatic ring are contained in a molecule.

Condition 3: All carbon atoms, each of which is directly connected to an aromatic ring directly connected to a hydroxyl group and does not constitute the aromatic ring have no bond with a hydrogen atom.

Condition 4: All carbon atoms, each of which is directly connected to an aromatic ring directly connected to a hydroxyl group and does not constitute the aromatic ring are bonded by a single bond to atoms other than hydrogen atoms.

The cellulose acylate and the compound A are as described above.

(Preparation of Dope)

A solution in which the cellulose acylate and the compound A are dissolved in a solvent is also called a dope.

In a method for manufacturing a polarizing plate protective film of the present invention, manufacture is preferably performed by a solvent casting method. In the solvent casting method, a film can be manufactured by co-casting using a core layer-forming dope and a skin layer-forming dope.

An organic solvent preferably includes a solvent selected from an ether having 3 to 12 carbon atoms, a ketone having 3 to 12 carbon atoms, an ester having 3 to 12 carbon atoms, and a halogenated hydrocarbon having 1 to 6 carbon atoms. The ether, the ketone, and the ester may have cyclic structures. A compound having two or more of any of ether, ketone, and ester functional groups (that is, —O—, —CO—, and COO—) can also be used as the organic solvent. The organic solvent may have another functional group such as an alcoholic hydroxyl group. In a case where the organic solvent has two or more types of functional groups, it is sufficient that the number of carbon atoms thereof is within a specified range of a compound having any of the functional groups.

Examples of ethers having 3 to 12 carbon atoms include diisopropyl ether, dimethoxymethane, dimethoxyethane, 1,4-dioxane, 1,3-dioxolane, tetrahydrofuran, anisole, and phenetole.

Examples of ketones having 3 to 12 carbon atoms include acetone, methyl ethyl ketone, diethyl ketone, diisobutyl ketone, cyclohexanone, and methylcyclohexanone.

Examples of esters having 3 to 12 carbon atoms include ethyl formate, propyl formate, pentyl formate, methyl acetate, ethyl acetate, and pentyl acetate.

Examples of the organic solvent having two or more types of functional groups include 2-ethoxyethyl acetate, 2-methoxyethanol, and 2-butoxyethanol.

The number of carbon atoms of the halogenated hydrocarbon is preferably 1 or 2, and most preferably 1. A halogen of the halogenated hydrocarbon is preferably chlorine. In the halogenated hydrocarbon, a proportion at which hydrogen atoms are substituted with halogens is preferably 25% to 75% by mol, more preferably 30% to 70% by mol, even more preferably 35% to 65% by mol, and most preferably 40% to 60% by mol. Methylene chloride is a representative halogenated hydrocarbon.

Preparation of the dope can be carried out by using a method and an apparatus for preparing a dope in a usual solvent casting method.

The dope can be prepared by stirring a polymer and an organic solvent at a normal temperature (0° C. to 40° C.). For the dope of a high concentration, stirring may be carried out under a condition of pressurization and heating. Specifically, the polymer and the organic solvent are placed in a pressurized container and sealed, and the mixture is stirred under pressurization while being heated to a temperature which is equal to or higher than a boiling point of the solvent at a normal temperature and is within a range where the solvent does not boil. A heating temperature is usually 40° C. or higher, preferably 60° C. to 200° C., and more preferably 80° C. to 110° C.

The respective components may be roughly mixed beforehand and then placed in the container. Alternatively, the respective components may be charged into the container in a sequential manner. The container needs to be configured to be able to perform stirring. Pressurization of the container can be done by injecting an inert gas such as nitrogen gas. In addition, an increase in a vapor pressure of the solvent by heating may be utilized. Alternatively, after sealing the container, the respective components may be added under pressurization.

In a case of heating, heating is preferably done from an outside of the container. For example, it is possible to use a jacket-type heating device. In addition, it is also possible to heat the entire container by providing a plate heater outside the container and circulating a liquid by piping.

It is preferable to provide a stirring blade inside the container and to perform stirring by using the stirring blade. It is preferable that the stirring blade has a length to reach near a wall of the container. At a tip of the stirring blade, it is preferable to provide a scraping blade for renewing a liquid film on the wall of the container.

Instruments such as a pressure gauge and a thermometer may be installed in the container. The respective components are dissolved in a solvent in the container. The prepared dope is taken out of the container after cooling, or is taken out of the container and then cooled using a heat exchanger or the like.

(Co-Casting)

A co-casting method is a casting method in which casting for the respective layers is simultaneously performed by causing the respective dopes for layer formation of the respective layers (which may be two or more layers) to be simultaneously extruded from separate slits or the like on a drum or band, and causing the dopes to be extruded from a casting geeser, the resultant product is peeled off from a support at an appropriate timing, and dried to form a film. In addition, a sequential co-casting may be performed.

It is preferable to finish a surface of the drum or band in a mirror surface state. Casting and drying methods in the solvent casting method are described in U.S. Pat. Nos. 2,336,310A, 2,367,603A, 2,492,078A, 2,492,977A, 2,492, 978A, 2,607,704A, 2,739,069A, 2,739,070A, GB640731B, GB736892B, 1970-4554B (JP-S45-4554B), JP1974-5614B (JP-S49-5614B), JP1985-176834A (JP-S60-176834A), JP1985-203430A (JP-S60-203430A), and JP1987-115035A (JP-S62-115035 A).

As a preferred mode of the long film of the present invention, there is a method for manufacturing a long film having a core layer and a skin layer, the method including:

a step of co-casting a core layer-forming dope which contains the cellulose acylate and a skin layer-forming dope which contains the cellulose acylate, in which the compound A is contained in at least one of the core layer-forming dope and the skin layer-forming dope.

A concentration of solid contents of the core layer-forming dope is preferably 12% to 25% by mass, and more preferably 15% to 25% by mass.

A concentration of solid contents of the skin layer-forming dope is preferably 12% to 25% by mass, and more preferably 12% to 20% by mass.

In addition, the solid contents mean components other than a solvent.

The film of the present invention can be preferably used as a polarizing plate protective film.

[Long Polarizing Plate]

A long polarizing plate of the present invention contains the long film of the present invention and a polarizer. As the polarizer, a known polarizer can be used, and a polyvinyl alcohol film dyed with iodine is typically mentioned.

The long polarizing plate can be cut into an appropriate size and used for a liquid crystal display device or the like.

[Liquid Crystal Display Device]

The liquid crystal display device of the present invention contains a liquid crystal cell and a film obtained from the long film of the present invention or a polarizing plate obtained from the long polarizing plate of the present invention. In addition, the liquid crystal display device is more preferably a liquid crystal display device which contains a liquid crystal cell and two polarizing plates disposed on both sides of the liquid crystal cell, in which at least one of the polarizing plates is a polarizing plate obtained from the long polarizing plate of the present invention.

As the liquid crystal cell, liquid crystal cells of various display modes can be used, and, for example, various display modes such as twisted nematic (TN), in-plane switching (IPS), ferroelectric liquid crystal (FLC), anti-ferroelectric liquid crystal (AFLC), optically compensatory bend (OCB), super twisted nematic (STN), vertically aligned (VA), and hybrid aligned nematic (HAN) have been proposed.

In the liquid crystal display device of the present invention, the liquid crystal cell is preferably a VA-mode or IPS-mode liquid crystal cell, and particularly preferably a VA-mode liquid crystal cell.

EXAMPLES

Hereinafter, the present invention will be described more specifically by way of examples. Materials, amounts used, proportions, treatment details, treatment procedures, and the like shown in the following examples can be appropriately changed to the extent that the present invention does not deviate from a spirit thereof. Therefore, a scope of the present invention is not limited to the following specific examples.

Example 1

(Preparation of First Skin Layer Dope and Second Skin Layer Dope)

The following composition was charged into a mixing tank and stirred while heating so that the respective components are dissolved to prepare a first skin layer dope and a second skin layer dope.

| | |
|---|---|
| Cellulose acylate A1 | 100 parts by mass |
| Silica particle dispersion liquid (average particle diameter of 20 nm) (AEROSIL (registered trademark) R972, manufactured by Nippon Aerosil Co., Ltd.) | 0.078 parts by mass |
| Methylene chloride | 339 parts by mass |
| Methanol | 74 parts by mass |
| Butanol | 3 parts by mass |

(Preparation of Core Layer Dope)

The following composition was charged into a mixing tank and stirred while heating so that the respective components are dissolved to prepare a core layer dope.

| | |
|---|---|
| Cellulose acylate A1 | 100 parts by mass |
| Compound C1 | 10 parts by mass |
| Methylene chloride | 266 parts by mass |
| Methanol | 58 parts by mass |
| Butanol | 2.6 parts by mass |

(Film Formation by Co-Casting)

As a casting die, an apparatus which is equipped with a feed block adjusted for co-casting so as to be able to form a film having a three-layer structure was used. The first skin layer dope, the core layer dope, and the second skin layer dope were co-cast from the casting die onto a drum (mirror surface stainless steel support) having a diameter of 3 m which had been cooled to −7° C. such that the first skin layer dope became an air interface side, and a drying air at 34° C. was applied on the drum at 270 m$^3$/min for 10 seconds. At this time, flow rates of the respective dopes were adjusted so that a thickness ratio is first skin layer/core layer/second skin layer=5/53/2.

Then, a cellulose acylate film (web) which had been cast and rolled was peeled off from the drum at 50 cm before an end point of a casting portion, and then clipped at both ends with a pin tenter. During peeling, stretching was carried out at a stretching ratio of 5% in a conveying direction (MD direction).

The stretching ratio (%) in the MD direction is obtained by the following expression.

Stretching ratio (%) in *MD* direction=100×{(length after stretching)−(length before stretching)}/ length before stretching The web held by the pin tenter was conveyed to a drying zone. In a first drying, a drying air at 45° C. was blown for 1 minute and then dried at 110° C. for 5 minutes. At this time, the web was conveyed while being stretched at a stretching ratio of 10% in a direction (TD direction) orthogonal to the conveying direction.

The stretching ratio in the TD direction is obtained by the following expression.

Stretching ratio in *TD* direction=(film width after stretching−film width before stretching)/film width before stretching×100(%)

After unclipping the web from the pin tenter, a part held by the pin tenter was continuously cut and dried at 145° C. for 10 minutes while applying a tension of 210 N in the MD direction. Furthermore, end portions in a width direction were continuously cut so that a width of the web became a desired width, and a roughness having a width of 15 mm and a height of 10 μm was attached to both ends of the web in a width direction so that a film having a film thickness of 40 μm and a width of 1,980 mm was produced. A film was formed continuously to be 4,000 m and a long film of Example 1 was produced.

Examples 2 and 3, and Comparative Example 1

In Examples 2 and 3 and Comparative Example 1, long films were produced in the same manner as in Example 1 except that the compound C1 added to the core layer-forming dope in Example 1 was changed to compounds shown in Table 3, and, furthermore, in Example 3 and Comparative Example 1, a compound U1 was added to the core layer-forming dope in an amount of 2.4 parts by mass with respect to 100 parts by mass of the cellulose acylate (A1).

Cellulose acylates and additives used in the examples and the comparative examples are shown below.

TABLE 1

| Cellulose acylate | Degree of substitution of acetyl groups | Degree of substitution of propionyl groups |
|---|---|---|
| A1 | 2.8 | 0 |
| A2 | 1.6 | 0.9 |
| A3 | 2.5 | 0 |
| A4 | 2.1 | 0 |
| A5 | 0.2 | 1.6 |

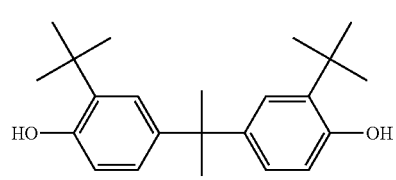

C1

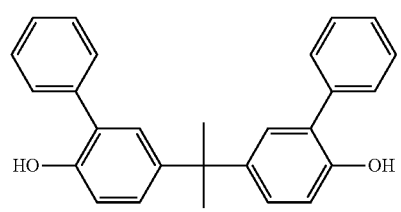

C2

-continued

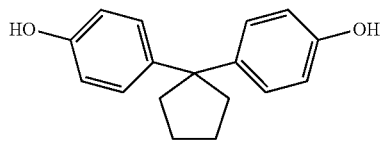

C3

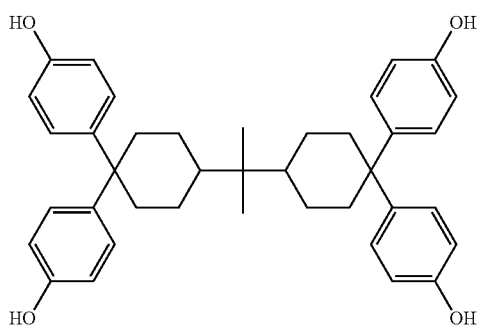

C4

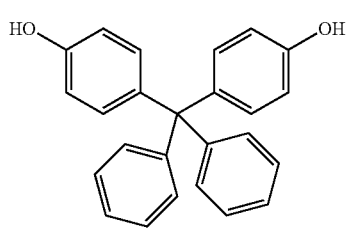

C5

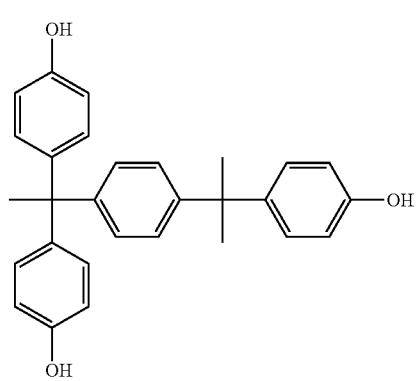

C6

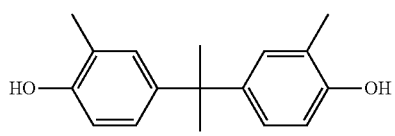

C7

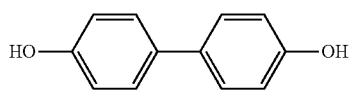

C8

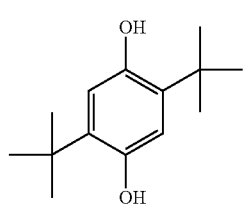

C9

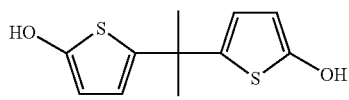

C10

-continued

C11
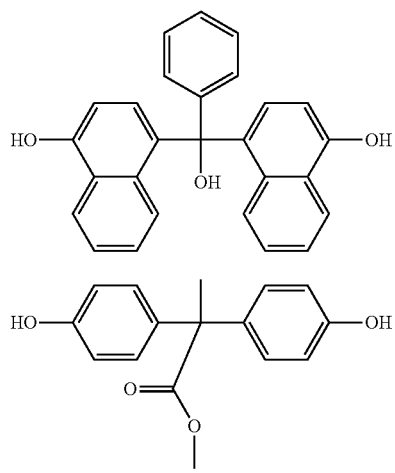

C12

C13
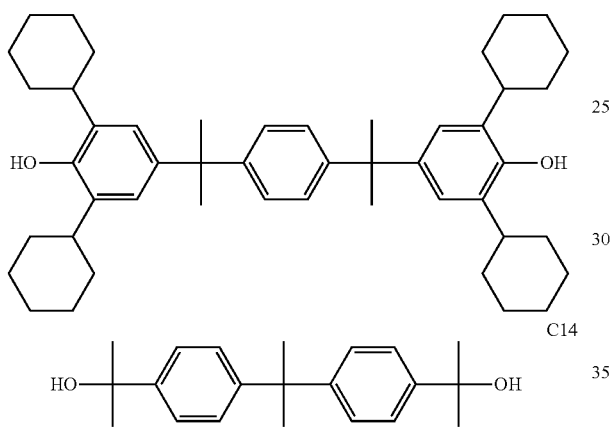

C14

C15

C16
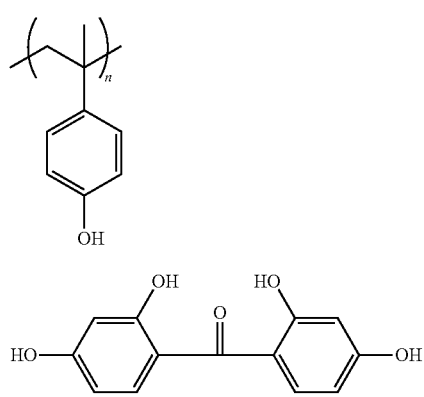

TABLE 2

| Compound | Molecular weight | Number of aromatic rings | Number of aromatic rings to which OH is directly connected | Number of aromatic rings per 100 molecular weight |
|---|---|---|---|---|
| C1 | 341 | 2 | 2 | 0.59 |
| C2 | 380 | 4 | 2 | 1.05 |
| C3 | 254 | 2 | 2 | 0.79 |
| C4 | 577 | 4 | 4 | 0.69 |
| C5 | 352 | 4 | 2 | 1.14 |
| C6 | 425 | 4 | 3 | 0.94 |
| C7 | 256 | 2 | 2 | 0.78 |
| C8 | 186 | 2 | 2 | 1.08 |
| C9 | 222 | 1 | 1 | 0.45 |
| C10 | 240 | 2 | 2 | 0.83 |
| C11 | 392 | 5 | 2 | 1.28 |
| C12 | 272 | 2 | 2 | 0.74 |
| C13 | 675 | 3 | 2 | 0.44 |
| C14 | 312 | 2 | 0 | 0.64 |
| C15 | Mn 1500 | — | — | — |
| C16 | 246 | 2 | 2 | 0.81 |

U1
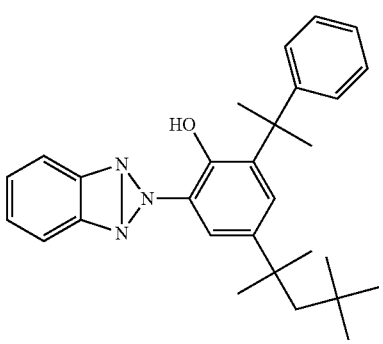

Example 4

(Preparation of Core Layer Dope)

A cellulose acylate A2 (100 parts by mass) and a compound C6 (10 parts by mass) were charged into a mixing tank together with a solvent. The mixture was stirred to dissolve the respective components to prepare a core layer dope. As the solvent, a mixed solvent in which methylene chloride/methanol were mixed at a mass ratio of 87/13 was used to prepare the core layer-forming dope so that a concentration of solid contents therein was 20% by mass.

(Preparation of First Skin Layer Dope and Second Skin Layer Dope)

The cellulose acylate A1 was charged into a mixing tank together with a solvent, and the mixture was stirred and dissolved to prepare a cellulose acylate solution 1. As the solvent, a mixed solvent in which methylene chloride/methanol were mixed at a mass ratio of 87/13 was used to prepare the cellulose acylate solution 1 so that a concentration of solid contents therein was 16% by mass.

(Preparation of Matting Agent Dispersion Liquid M1)

The following composition was charged into a dispersing machine and stirred so that the respective components were dissolved to prepare a matting agent dispersion liquid M1.

Silica particles having average particle size of 20 nm) (AEROSIL (registered trademark) R972, manufactured by Nippon Aerosil Co., Ltd.)    2.0 parts by mass -continued

| Methylene chloride | 76.1 parts by mass |
| Methanol | 11.4 parts by mass |
| Cellulose acylate solution 1 | 12.6 parts by mass |

The matting agent dispersion liquid M1 was mixed with the cellulose acylate solution 1 prepared above at proportions shown below to prepare the first skin layer dope and the second skin layer dope.

| Cellulose acylate solution 1 | 100.0 parts by mass |
| Matting agent dispersion liquid M1 | 7.1 parts by mass |

<Film Formation of Polarizing Plate Protective Film>
(Casting)

The dopes prepared above were cast by a band casting machine. At this time, co-casting was carried out so that starting from an air interface side, the first skin layer dope, the core layer-forming dope, and a second skin layer dope were formed.

In a case of casting the dopes, the dopes were co-cast on a running band from a casting die. Here, a simultaneous multilayer co-cast web was formed so that the core layer is made thickest by adjusting a casting amount of each dope, and as a result, a ratio of a thickness of the core layer and thicknesses of the skin layers in the film after stretching becomes a value represented by first skin layer/core layer/second skin layer=1/40/1.

Next, this web was peeled off from the casting band and dried at a transition portion and a tenter to obtain a film. Immediately after peeling off the dopes, a residual solvent amount was about 25% by mass. The film was sent to a drying chamber of which a temperature was adjusted to 140° C., and the film was dried until the residual solvent amount became 1% during conveyance while being wrapped around a large number of rollers.

The residual solvent amount was obtained according to the following expression.

Residual solvent amount (% by mass)={$(M-N)/N$}×100

M is a mass at any time point of the web, and N is a mass in a case where the web for which M has been measured is dried at 120° C. for 2 hours.

(Stretching)

The film obtained by casting was gripped with a clip and stretched in a transverse direction (TD direction) under a fixed end uniaxial condition. A stretching temperature and a stretching ratio were 175° C. and 30%.

(Moisture-Heat Treatment)

For each film which had been subjected to a stretching treatment, a dew condensation prevention treatment, a moisture-heat treatment (water vapor contact treatment), and a heat treatment were sequentially performed.

In the dew condensation prevention treatment, dry air was applied to each film, and a film temperature Tf0 was regulated to 120° C.

In the moisture-heat treatment (water vapor contact treatment), an absolute humidity (moisture-heat treatment absolute humidity) of a wet gas in a wet gas contact chamber is regulated to be 250 g/m$^3$ and a dew point of the wet gas is regulated to be 10° C. or higher than the temperature Tf0 of each film. Each film was conveyed while maintaining a state where a temperature (moisture-heat treatment temperature) of each film was 100° C. for only a treatment time (60 seconds).

In the heat treatment, an absolute humidity (heat treatment absolute humidity) of a gas in a heat treatment chamber was set to be 0 g/m$^3$, and a temperature (heat treatment temperature) of each film was set to be the same temperature as the moisture-heat treatment temperature, and these settings were maintained for only a treatment time (2 minutes). A film surface temperature was obtained by attaching a tape-type thermocouple surface temperature sensor (ST series manufactured by Anritsu Meter Co., Ltd.) at three points on the film and calculating each average value.

(Winding-Up)

Thereafter, after being cooled to 23° C., each film was wound up and was continuously formed into a film in a thickness of 40 μm and a width of 1,980 mm so that a long film of Example 4 having a length of 4,000 m was obtained.

Long films of Examples 5 to 13, and Comparative Examples 2 to 9 were obtained in the same manner except that a formulation for the core layer dope (a cellulose acylate and additives) was changed as shown in Table 3 and a stretching temperature was corrected. As a method of correcting the stretching temperature, a glass transition temperature (Tg) of each film was measured, and the stretching temperature was corrected so that a difference between the Tg of the film and the stretching temperature was made constant. Tg represents a glass transition temperature (unit: ° C.), and means a temperature at which, in a case where a dynamic viscoelasticity tan δ of the film in case of having a residual solvent amount of 0% was measured, the tan δ shows a peak.

[Characteristics of Film]

With respect to the films of the examples and the comparative examples, thicknesses, in-plane retardations (Re (550)) at a wavelength of 550 nm, and thickness-direction retardations (Rth (550)) at a wavelength of 550 nm were measured.

[End Portion Curls]

A curl value of the film can be measured according to a measurement method prescribed by the American National Standards Institute (ANSI/ASC PH 1.29-1985, Method-A). Specifically, for the end portion curl value of the film, the film is cut to a size of 35 mm in a width direction and 2 mm in a longitudinal direction from a part which is 200 mm away from a width-direction end portion of the film, and then mounted on a curl plate. A value obtained by reading a curl value after performing humidity regulation for 6 hours under an environment of a temperature of 25° C. and a relative humidity of 10% is defined as an end portion curl value. The curl value is expressed by a radius of curvature (cm), and a smaller radius of curvature indicates a worse conveying performance. A case where curls are formed with a surface which was a support side at casting being an inside is defined as plus, and a case where curls are formed with a surface which was an air side at casting being an inside is defined as minus. However, in the present invention, the end portion curl refers to an absolute value of a curl value. The end portion curl was evaluated based on the following standard. In the following standard, 1 to 3 are levels with no problem for practical use.

1: (absolute value of curl value)≥30 cm
2: 30 cm>(absolute value of curl value)≥20 cm
3: 20 cm>(absolute value of curl value)≥10 cm
4: 10 cm>(absolute value of curl value)

(Production of Opposite Film)

A long film which is an opposite film 101 was produced in the same manner as in Example 1 except that formulations for the first skin layer dope, the second skin layer dope, and the core layer dope were changed as shown below and a film thickness after completion was set to 60 μm.

(Composition of First Skin Layer Dope and Second Skin Layer Dope)

| | |
|---|---|
| Cellulose acylate (acetyl substitution degree of 2.86) | 100 parts by mass |
| Sugar ester compound S1 | 3 parts by mass |
| Sugar ester compound S2 | 1 part by mass |
| Compound U1 | 2.4 parts by mass |
| Silica particle dispersion liquid (average particle diameter of 20 nm) (AEROSIL (registered trademark) R972, manufactured by Nippon Aerosil Co., Ltd.) | 0.078 parts by mass |
| Methylene chloride | 339 parts by mass |
| Methanol | 74 parts by mass |
| Butanol | 3 parts by mass |

(Composition of Core Layer Dope)

| | |
|---|---|
| Cellulose acylate (acetyl substitution degree of 2.86) | 100 parts by mass |
| Sugar ester compound S1 | 7.7 parts by mass |
| Sugar ester compound S2 | 2.3 parts by mass |
| Compound U1 | 2.4 parts by mass |
| Methylene chloride | 266 parts by mass |
| Methanol | 58 parts by mass |
| Butanol | 2.6 parts by mass |

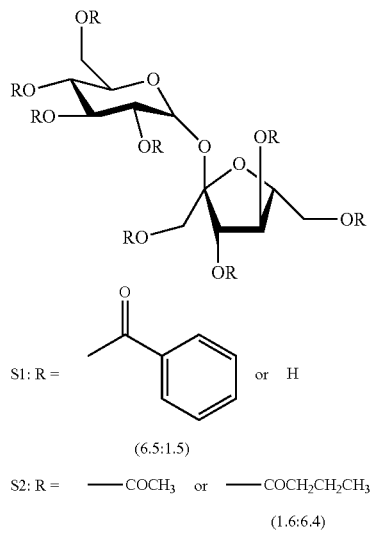

(Production of Long Polarizing Plates Containing Long Films of Examples and Comparative Examples)

[Saponification Treatment of Polarizing Plate Protective Film]

The long film produced in each of the examples and the comparative examples was continuously fed and immersed in a 2.3 mol/L of sodium hydroxide aqueous solution at 55° C. for 30 seconds. Furthermore, continuously, the film was washed in a pure water bath at 25° C. for 2 minutes and further dried with warm air at 100° C. to obtain a saponified polarizing plate protective film. The opposite film 101 was also saponified in the same manner.

[Production of Polarized]

A long polyvinyl alcohol film which has a thickness of 60 μm and is formed of polyvinyl alcohol having an average polymerization degree of about 2,400 and a degree of saponification of equal to or greater than 99.9% by mol was fed, immersed in pure water at 30° C., and then immersed in an aqueous solution having iodine/potassium iodide/water at a mass ratio of 0.02/2/100 at 30° C. Thereafter, the film was immersed in an aqueous solution having potassium iodide/boric acid/water at a mass ratio of 12/5/100 at 56.5° C. Subsequently, the film was washed with pure water at 8° C. and dried at 65° C. to obtain a polarizer in which iodine is adsorbed and aligned on a polyvinyl alcohol film. Stretching was mainly carried out in a longitudinal direction in an iodine staining and boric acid treatment step, and a total stretching ratio was 5.3 times.

[Lamination of Polarizer and Polarizing Plate Protective Film]

Using a polyvinyl alcohol-based adhesive, the polarizer manufactured as described above was fed so as to be sandwiched between each of the saponified films of the examples and the comparative examples, and the saponified opposite film 101, bonding was continuously carried out, and dried at 80° C. to obtain a long polarizing plate.

At this time, in order to obtain a long polarizing plate, the bonding was carried out in such a manner that a longitudinal direction of the polarizer coincides with longitudinal directions of the films sandwiching the polarizer.

[Polarizing Plate Storability]

From the long polarizing plate obtained as described above, a small piece of the polarizing plate with a size of 40 mm square was cut. The obtained small piece of the polarizing plate was laminated on a glass substrate via a SK 2057 (sheet-like pressure sensitive adhesive, manufactured by Soken Chemical & Engineering Co., Ltd.) in such a manner that each of the films produced in the examples and the comparative examples was disposed on the glass substrate side, humidity regulation was performed for 24 hours at a temperature of 25° C. and a relative humidity of 60%, and then an optical characteristic (initial Rth) was measured at 550 nm using AxoScan OPMF-1 (manufactured by Optoscience) under an environment of a temperature of 25° C. and a relative humidity of 60%. Thereafter, the samples were stored for 500 hours under an environment of a temperature of 85° C. and a relative humidity of 85%, and, for all samples, humidity regulation was performed again at a temperature of 25° C. and a relative humidity of 60% for 24 hours. Then, an optical characteristic (Rth after storage at a high temperature and a high humidity) was measured under an environment of a temperature of 25° C. and a relative humidity of 60%, and β represented by the following expression was obtained. As described above, Rth (wavelength of 550 nm) of each of the films of the examples and the comparative Examples was separately measured. In a case where an optical characteristic change amount β after storage at a high temperature and a high humidity as shown below is 1 or 2, it can be determined that there is no problem for practical use.

(Evaluation Standard of Optical Characteristic Change Amount β After Storage at High Temperature and High Humidity)

β=($Rth$ after high temperature and high humidity storage)−(initial $Rth$)

1: β is equal to or less than 25 nm
2: β is greater than 25 nm and equal to or less than 50 nm
3: β is greater than 50 nm

[Reworkability]

From a center portion of the long polarizing plate in a width direction, small pieces of the polarizing plate having a size of 320 mm×240 mm which is ±160 mm in a width direction and ±120 mm in a longitudinal direction were cut. The obtained small piece of the polarizing plate was laminated on a glass substrate via a SK 2057 (sheet-like pressure sensitive adhesive, manufactured by Soken Chemical & Engineering Co., Ltd.) in such a manner that each of the films produced in the examples and the comparative examples was disposed on the glass substrate side, humidity regulation was performed for 24 hours at a temperature of 25° C. and a relative humidity of 60%, and then the piece was peeled off from the glass substrate under an environment at a temperature of 25° C. and a relative humidity of 60%. On the glass substrate, an extent of peeling residues for each of the films of the examples and the comparative examples was visually identified, and reworkability was evaluated based on the following standard. In the following standard, 1 and 2 are levels with no problem for practical use.

1: No peeling residues are identified at all.
2: There is a slight amount of peeling residues.
3: There is a large amount of peeling residues.

[Evaluation of Foreign Matters]

Evaluation of foreign matters on the long film was carried out by a surface inspection printing method. In the surface inspection printing method, foreign matters are recognized by analyzing a scattering intensity of a laser beam and performing numerical conversion therefor. Although the foreign matters have various shapes, the smallest rectangle was drawn which can just surround each foreign matter, and, among the rectangles, those with one side of equal to or greater than 50 μm were counted. Films being conveyed during film formation were continuously inspected and evaluated using the number of foreign matters obtained by inspecting 1,000 m². In the following standard, 1 and 2 are levels with no problem for practical use.

1: Equal to and greater than 0 and less than 30/1,000 m²
2: Equal to and greater than 30 and less than 50/1,000 m²
3: Equal to and greater than 50/1,000 m²

TABLE 3

| | Cellulose acylate | Formulation for core layer dope | | | | Film thickness (μm) | Film characteristics | | End portion curls | Polarizing plate storability | Rework-ability | Foreign matters |
| | | Additive 1 | | Additive 2 | | | Re(550) (nm) | Rth(550) (nm) | | | | |
| | | Compound | Addition amount* | Compound | Addition amount* | | | | | | | |
|---|---|---|---|---|---|---|---|---|---|---|---|---|
| Example 1 | A1 | C1 | 10 | — | — | 40 | 3 | 2 | 1 | 1 | 1 | 1 |
| Example 2 | A1 | C4 | 10 | — | — | 40 | 1 | 3 | 1 | 1 | 1 | 1 |
| Example 3 | A1 | C6 | 10 | U1 | 2.4 | 40 | 2 | 25 | 1 | 1 | 1 | 1 |
| Comparative Example 1 | A1 | C7 | 10 | U1 | 2.4 | 40 | 2 | 25 | 1 | 3 | 1 | 2 |
| Example 4 | A2 | C6 | 10 | — | — | 40 | 45 | 118 | 1 | 1 | 1 | 1 |
| Example 5 | A3 | C2 | 10 | — | — | 40 | 47 | 119 | 1 | 1 | 1 | 1 |
| Example 6 | A3 | C3 | 10 | — | — | 45 | 48 | 121 | 1 | 1 | 1 | 2 |
| Example 7 | A3 | C4 | 10 | — | — | 50 | 46 | 116 | 1 | 1 | 1 | 1 |
| Compartive Example 2 | A3 | C5 | 10 | — | — | 40 | 45 | 118 | 4 | 1 | 3 | 1 |
| Example 8 | A3 | C6 | 10 | — | — | 40 | 51 | 125 | 1 | 1 | 1 | 1 |
| Comparative Example 3 | A3 | C7 | 10 | — | — | 45 | 49 | 122 | 1 | 3 | 1 | 2 |
| Comparative Example 4 | A3 | C8 | 10 | — | — | 40 | 45 | 123 | 4 | 1 | 3 | 3 |
| Comparative Example 5 | A3 | C9 | 10 | — | — | 55 | 50 | 121 | 4 | 1 | 3 | 2 |
| Example 9 | A3 | C10 | 10 | — | — | 45 | 47 | 122 | 2 | 1 | 1 | 2 |
| Example 10 | A3 | C11 | 10 | — | — | 37 | 43 | 119 | 1 | 1 | 2 | 1 |
| Example 11 | A3 | C12 | 10 | — | — | 49 | 51 | 117 | 1 | 1 | 1 | 2 |
| Comparative Example 6 | A3 | C13 | 10 | — | — | 55 | 47 | 126 | 1 | 3 | 1 | 1 |
| Comparative Example 7 | A3 | C14 | 10 | — | — | 46 | 50 | 117 | 4 | 1 | 3 | 1 |
| Comparative Example 8 | A3 | C15 | 10 | — | — | 47 | 49 | 120 | 4 | 1 | 3 | 1 |
| Example 12 | A4 | C6 | 10 | — | — | 30 | 53 | 118 | 3 | 2 | 1 | 1 |
| Example 13 | A5 | C6 | 10 | — | — | 30 | 54 | 122 | 3 | 2 | 1 | 1 |
| Comparative Example 9 | A3 | C16 | 10 | — | — | 40 | 51 | 116 | 4 | 1 | 3 | 2 |

*Each of addition amounts of additives 1 and 2 is parts by mass with respect to 100 parts by mass of the cellulose acylate.

From the above results, in each of the long films of the examples, end portion curls and foreign matters were suppressed, and, in the polarizing plate using each of the long films of the examples, excellent polarizing plate storability and reworkability were exhibited.

According to the present invention, it is possible to provide a long film which is excellent in polarizing plate storability and reworkability due to suppression of end portion curls and foreign matters, a long polarizing plate containing the long film, a liquid crystal display device containing a film or polarizing plate obtained from the long film or long polarizing plate, and a method for manufacturing the long film.

While the present invention has been described in detail and with reference to specific embodiments, it will be apparent to those skilled in the art that various changes and modifications can be made without departing from the spirit and scope of the present invention.

What is claimed is:
1. A long film comprising:
   a cellulose acylate; and
   a compound A having a molecular weight of less than 1,000 which satisfies all of the following conditions 1, 2, 3, and 4:

Condition 1: Two or more aromatic rings, each of which is directly connected to a hydroxyl group, are contained in a molecule, Condition 2: One or more carbon atoms which are directly connected to an aromatic ring directly connected to a hydroxyl group and do not constitute the aromatic ring are contained in a molecule, and such carbon atoms are directly connected to 1 to 3 aromatic rings, Condition 3: All carbon atoms, each of which is directly connected to an aromatic ring directly connected to a hydroxyl group and does not constitute the aromatic ring have no bond with a hydrogen atom, and Condition 4: All carbon atoms, each of which is directly connected to an aromatic ring directly connected to a hydroxyl group and does not constitute the aromatic ring are bonded by a single bond to atoms other than hydrogen atoms, wherein the compound A is a compound represented by General Formula (1),

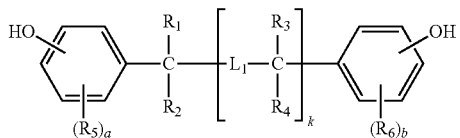

(1)

in General Formula (1), $R_1$ to $R_4$ each independently represent an alkyl group, an aryl group, a hydroxyl group, an acyl group, an alkoxy group, or an alkyloxycarbonyl group, $R_1$ and $R_2$ are not combined with each other, $R_3$ and $R_4$ are not combined with each other, $R_5$ and $R_6$ each independently represent a tertiary alkyl group or an aryl group, a represents an integer of 1 to 4, b represents an integer of 0 to 4, $L_1$ represents a single bond or a divalent linking group, and k represents 0 or 1.

2. The long film according to claim 1,
wherein the compound A is contained in an amount of 1 to 30 parts by mass with respect to 100 parts by mass of the cellulose acylate.

3. A long polarizing plate, comprising:
the long film according to claim 1; and
a polarizer.

4. A liquid crystal display device, comprising:
a liquid crystal cell; and
a film obtained from the long film according to claim 1.

5. A method for manufacturing a long film, comprising:
performing film formation by a solution film-forming method using a solution obtained by dissolving a cellulose acylate and a compound A having a molecular weight of less than 1,000 which satisfies all of the following conditions 1, 2, 3, and 4 in a solvent:

Condition 1: Two or more aromatic rings, each of which is directly connected to a hydroxyl group, are contained in a molecule, Condition 2: One or more carbon atoms which are directly connected to an aromatic ring directly connected to a hydroxyl group and do not constitute the aromatic ring are contained in a molecule, and such carbon atoms are directly connected to 1 to 3 aromatic rings, Condition 3: All carbon atoms, each of which is directly connected to an aromatic ring directly connected to a hydroxyl group and does not constitute the aromatic ring have no bond with a hydrogen atom, and Condition 4: All carbon atoms, each of which is directly connected to an aromatic ring directly connected to a hydroxyl group and does not constitute the aromatic ring are bonded by a single bond to atoms other than hydrogen atoms, wherein the compound A is a compound represented by General Formula (1),

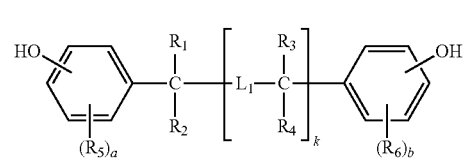

(1)

in General Formula (1), $R_1$ to $R_4$ each independently represent an alkyl group, an aryl group, a hydroxyl group, an acyl group, an alkoxy group, or an alkyloxycarbonyl group, $R_1$ and $R_2$ are not combined with each other, $R_3$ and $R_4$ are not combined with each other, $R_5$ and $R_6$ each independently represent a tertiary alkyl group or an aryl group, a represents an integer of 1 to 4, b represents an integer of 0 to 4, $L_1$ represents a single bond or a divalent linking group, and k represents 0 or 1.

* * * * *